(12) United States Patent
Oge et al.

(10) Patent No.: US 11,882,053 B2
(45) Date of Patent: Jan. 23, 2024

(54) COMMUNICATION SYSTEM, COMMUNICATION METHOD, AND COMPUTER PROGRAM PRODUCT

(71) Applicant: KABUSHIKI KAISHA TOSHIBA, Tokyo (JP)

(72) Inventors: Yasin Oge, Sagamihara Kanagawa (JP); Takahiro Yamaura, Kawasaki Kanagawa (JP); Yuta Kobayashi, Ota Tokyo (JP); Masashi Ito, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/184,346

(22) Filed: Feb. 24, 2021

(65) Prior Publication Data

US 2021/0377181 A1 Dec. 2, 2021

(30) Foreign Application Priority Data

Jun. 1, 2020 (JP) .................................. 2020-095718

(51) Int. Cl.
*H04L 47/62* (2022.01)
*G06F 11/00* (2006.01)
*H04L 41/0659* (2022.01)
*H04L 69/40* (2022.01)

(52) U.S. Cl.
CPC ........ *H04L 47/6205* (2013.01); *G06F 11/004* (2013.01); *H04L 41/0661* (2023.05); *H04L 69/40* (2013.01); *G06F 2201/86* (2013.01)

(58) Field of Classification Search
CPC . H04L 47/6205; H04L 29/14; H04L 41/9672; H04L 41/0661; H04L 69/40; G06F 11/004; G06F 2201/86
See application file for complete search history.

(56) References Cited

U.S. PATENT DOCUMENTS

| 10,681,128 | B2* | 6/2020 | Wetterwald | ............. H04L 67/01 |
| 2004/0141503 | A1* | 7/2004 | Sinha | .................... H04L 1/0007 |
| | | | | 370/389 |
| 2012/0166681 | A1* | 6/2012 | Suzuki | ................ G06F 13/4295 |
| | | | | 710/18 |

(Continued)

FOREIGN PATENT DOCUMENTS

| JP | 2019-96930 A | 6/2019 |
| JP | 2021-190902 A | 12/2021 |

OTHER PUBLICATIONS

IEEE Standards Association, "IEEE Standard for Local And Metropolitan Area Networks-Bridges and Bridged Networks" (IEEE Std 802.1Q™—2018, 1993 pages (2018).

*Primary Examiner* — Walter J Divito
*Assistant Examiner* — Anthony Luo
(74) *Attorney, Agent, or Firm* — Finnegan, Henderson, Farabow, Garrett & Dunner, LLP

(57) ABSTRACT

A communication system according an embodiment includes one or more hardware processors. The one or more hardware processors calculate indicators used to detect presence of abnormality caused by a situation in which a size of a message is larger than a maximum allowable size of a queue, the indicators being calculated based on gate control information including a plurality of entries each of which indicates gate states corresponding to a plurality of queues.

14 Claims, 17 Drawing Sheets

(56) References Cited

U.S. PATENT DOCUMENTS

| | | | |
|---|---|---|---|
| 2013/0235878 A1* | 9/2013 | Hirota | H04L 7/00 370/412 |
| 2017/0150493 A1* | 5/2017 | Seok | H04B 7/0452 |
| 2019/0158620 A1 | 5/2019 | Oge et al. | |
| 2019/0190791 A1* | 6/2019 | Bernardi | H04L 47/621 |
| 2019/0207862 A1* | 7/2019 | Kajio | H04L 67/12 |
| 2021/0029727 A1* | 1/2021 | Lowell | H04W 72/0453 |
| 2021/0194819 A1* | 6/2021 | Chen | H04L 65/4069 |
| 2021/0377189 A1 | 12/2021 | Yamaura et al. | |

* cited by examiner

FIG.4

| | GATE STATE | | | | | | | | TIME INTERVAL |
|---|---|---|---|---|---|---|---|---|---|
| | TC7 | TC6 | TC5 | TC4 | TC3 | TC2 | TC1 | TC0 | |
| T00 | o | c | o | c | o | c | o | o | 128 μs |
| T01 | c | o | o | o | o | o | o | o | 128 μs |
| T02 | o | o | c | o | c | o | c | o | 512 μs |
| T03 | o | o | c | o | c | o | c | o | 128 μs |
| T04 | c | c | o | c | o | c | o | o | 128 μs |
| T05 | o | c | o | c | o | c | o | o | 512 μs |

FIG.5

| | GATE STATE | | | | | | | | TIME INTERVAL |
|---|---|---|---|---|---|---|---|---|---|
| | TC7 | TC6 | TC5 | TC4 | TC3 | TC2 | TC1 | TC0 | |
| T00 | o (128 μs) | C | o (256 μs) | C | o (256 μs) | C | o (256 μs) | o (∞) | 128 μs |
| T01 | C | o (768 μs) | o (128 μs) | o (768 μs) | o (128 μs) | o (768 μs) | o (128 μs) | o (∞) | 128 μs |
| T02 | o (640 μs) | o (640 μs) | C | o (640 μs) | C | o (640 μs) | C | o (∞) | 512 μs |
| T03 | o (128 μs) | o (128 μs) | C | o (128 μs) | C | o (128 μs) | C | o (∞) | 128 μs |
| T04 | C | C | o (896 μs) | C | o (896 μs) | C | o (896 μs) | o (∞) | 128 μs |
| T05 | o (640 μs) | C | o (768 μs) | C | o (768 μs) | C | o (768 μs) | o (∞) | 512 μs |

COMMUNICATION SYSTEM, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2020-095718, filed on Jun. 1, 2020; the entire contents of which are incorporated herein by reference.

FIELD

Embodiments described herein relate generally to a communication system, a communication method, and a computer program product.

BACKGROUND

There are known communication devices that is compatible with time-sensitive networking (TSN) standard and the like and performs real-time communication over a network. According to TSN, by using a gate control list that describes enabling/disabling transmission of a queue by the hour, enabling/disabling transmission of a frame is determined to control a transmission timing and an amount of transmission.

However, it is difficult for the conventional art to maintain real-time performance of communication in some cases.

BRIEF DESCRIPTION OF THE DRAWINGS

FIG. 4 is a table illustrating an example of a gate control list;
FIG. 5 is a table illustrating an example of a continuous open duration.

DETAILED DESCRIPTION

Figure 1:
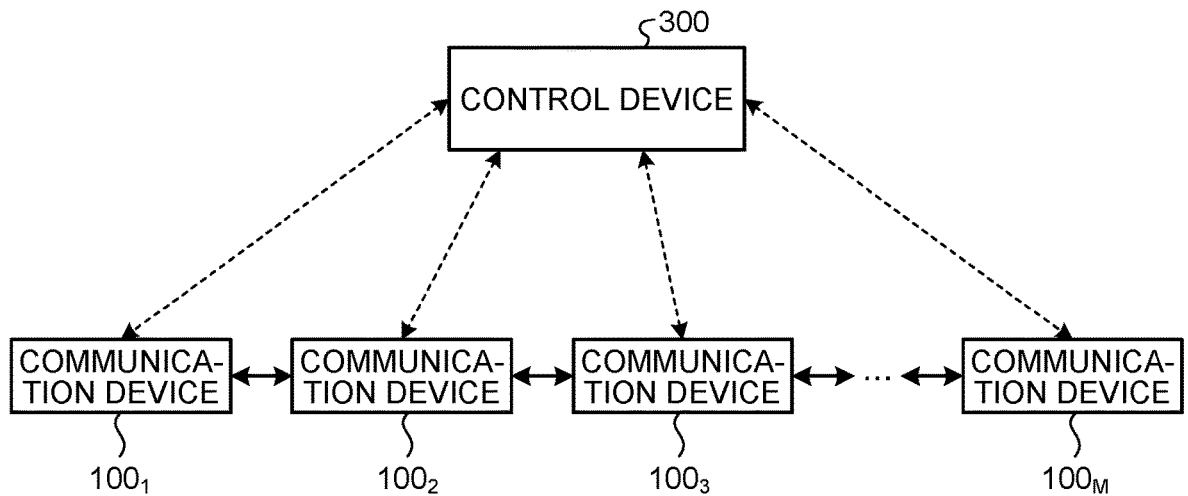
FIG. 1 is a configuration diagram of an information processing system according to a first embodiment.

A communication system according an embodiment includes one or more hardware processors. The one or more hardware processors calculate indicators used to detect presence of abnormality caused by a situation in which a size of a message is larger than a maximum allowable size of a queue, the indicators being calculated based on gate control information including a plurality of entries each of which indicates gate states corresponding to a plurality of queues.

Preferred embodiments of a communication system according to the present disclosure will be described in detail below with reference to the accompanying drawings. In the following description, while an example of using TSN as a standard of real-time communication will be mainly described, the applicable standard is not limited to TSN.

In TSN, a gate control list (example of gate control information) is used. The gate control list includes a plurality of entries determining whether to open a plurality of gates corresponding to a plurality of queues. For example, in TSN, during a gate open duration (during which a gate remains open), frames (an example of messages) can be transmitted over a plurality of entries in each of the plurality of queues, for a time period until the gate is finally closed. According to the standard of TSN, a gate switching interval ("TimeInterval") can be set with a granularity of 1 nanosecond. Therefore, in order to transmit a frame inserted into a transmission queue without delay, it is necessary to maintain the gate opening state for at least a time period equal to or longer than that required for transmission of the frame.

When the operation of IEEE 802.1Qbv defined as described above is implemented, a kind of deadlock problem may occur to faithfully reproduce the standard, under certain conditions. Specifically, when a frame of a certain size or larger is inserted into a transmission queue having a shorter TimeInterval of the gate opening state, transmission of that frame is not permitted indefinitely, the queue falling into a state such as deadlock. Furthermore, in such a case, transmission of all frames following the frame that causes the problem and inserted into the same queue is also temporarily stopped. This does not make it possible to give the processing real-time performance (completion of processing within a predetermined time).

The IEEE 802.1Q standard defines parameters called "queueMaxSDU" and "maximum Bridge transit delay". The queueMaxSDU corresponds to a maximum message size defined by the communication standard (IEEE 802.1Q), and based on the gate control information. When a frame having a size larger than that specified for the queueMaxSDU is inserted into the transmission queue, the frame is immediately discarded, which avoids the deadlock state as described above. Furthermore, when a frame having a size equal to or smaller than that specified for the queueMaxSDU is inserted into the transmission queue, a frame causing a problem is discarded by time-out after a time specified in the maximum Bridge transit delay.

A frame having a size larger than a size specified by the setting of queueMaxSDU is allowed to be discarded. However, in the standard, the TimeInterval of the gate opening state is not considered for setting a value of queueMaxSDU. Therefore, when the size of a frame permitted to be transmitted during a gate opening period is smaller than that specified for the queueMaxSDU, the above problem cannot be solved.

In addition, the standard defines a value of one second as a recommendation value of the maximum Bridge transit delay and four seconds as a maximum value thereof. However, when these values are used, although the deadlock itself is eliminated, the real-time performance of communication is impaired. The value of the maximum Bridge transit delay that is simply set short to maintain the real-time performance may further cause an undesired side effect such as discarding a normal frame stored in another transmission queue due to a time-out. Therefore, the above problem cannot be solved without such a side effect.

First Embodiment

The communication system according to a first embodiment detects an abnormal frame that may cause a deadlock problem in real time, and appropriately processes the abnormal frames as necessary. This makes it possible to avoid impairing the real-time performance of communication. For example, it is possible to maintain the real-time performance in communication of a normal frame that is inserted after an abnormal frame into the same transmission queue.

FIG. 1 is a diagram illustrating an exemplary configuration of an information processing system according to the first embodiment. As illustrated in FIG. 1, the information processing system includes M communication devices (M is an integer of 2 or more) $100_1$ to $100_M$ and a control device 300. The communication devices $100_1$ to $100_M$ and the control device 300 are connected over a network.

The communication devices $100_1$ to $100_M$ are a device that is communicable according to, for example, TSN. The communication devices $100_1$ to $100_M$ have similar functions, and the communication devices will be simply referred to as a communication device 100 when it is not necessary to distinguish between the communication devices $100_1$ to $100_M$. The communication device 100 is an example of the communication system.

The control device 300 is a server device that manages communication devices including the communication devices 100 on the network.

Figure 2:
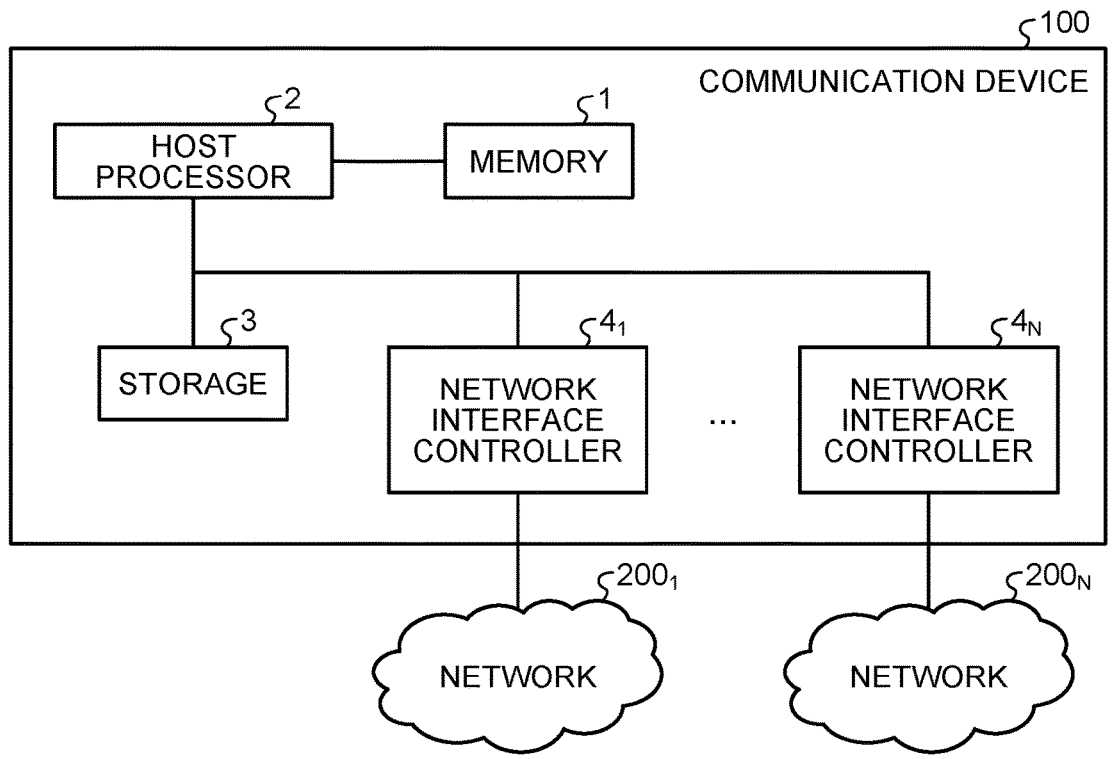
FIG. 2 is a hardware configuration diagram of a communication device according to the first embodiment.

FIG. 2 is a block diagram illustrating an example of a hardware configuration of the communication device 100 according to the first embodiment. As illustrated in FIG. 2, the communication device 100 includes a memory 1, a host processor 2, a storage 3, and N network interface controllers $4_1$ to $4_N$ (N is an integer of 1 or more).

The memory 1 is a storage medium configured to store primary data. The memory 1 is connected to the host processor 2 via a memory controller of the host processor 2. The memory 1 is implemented by, for example, dynamic random access memory (DRAM) and the like.

The host processor 2 is an element configured to process data. The host processor 2 is connected to the storage 3 and the network interface controllers $4_1$ to $4_N$ by using a bus such as PCI Express (registered trademark).

The host processor 2 loads an image of an execution program stored in the storage 3, on the memory 1 and executes processing while reading instructions and data on the memory 1. The processing is executed by one or more cores included in the host processor 2.

The storage 3 stores secondary data. The storage 3 is implemented by, for example, a hard disk drive (HDD) or a solid state drive (SSD).

The network interface controllers $4_1$ to $4_N$ connect the host processor 2 to networks $200_1$ to $200_N$. The network interface controllers $4_1$ to $4_N$ have similar functions, and the network interface controllers will be simply referred to as a network interface controller 4 when it is not necessary to distinguish between the network interface controllers $4_1$ to $4_N$. Likewise, the networks $200_1$ to $200_N$ are simply referred to as a network 200 when it is not necessary to distinguish between the networks $200_1$ to $200_N$.

The network 200 is, for example, Ethernet (registered trademark). Specifically, the network 200 is a network corresponding to a standard defined by IEEE 802.1. The standard defined by IEEE 802.1 is, for example, Audio Video Bridging (AVB) standard, Time-Sensitive Networking (TSN) standard, or the like. Furthermore, the network 200 may be any type. The network 200 includes, for example, an office network, a network inside a data center, an in-vehicle network, a network in a factory, a network for a mobile phone base station, a network for a core facility, or the like.

The network interface controller 4 is implemented by, for example, an application specific integrated circuit (ASIC), a field-programmable gate array (FPGA), or the like. Furthermore, the network interface controller 4 may include a combination of two or three of the ASIC, the FPGA, and a processor. Furthermore, the network interface controller 4 may include a built-in memory different from the memory 1 described above. Furthermore, the network interface controller 4 may be mounted as a chip separate from the host processor 2 or may be mounted as one chip as a system-on-a-chip (SoC).

Note that the memory 1, the storage 3, and the network interface controller 4 may be connected to the host processor 2 over a dedicated data bus or may be connected to the host processor 2 over a shared data bus.

Furthermore, the communication device 100 may be, for example, a terminal node that transmits and receives a frame on the network, a switch device that relays a frame on the network, or the like.

Figure 3:
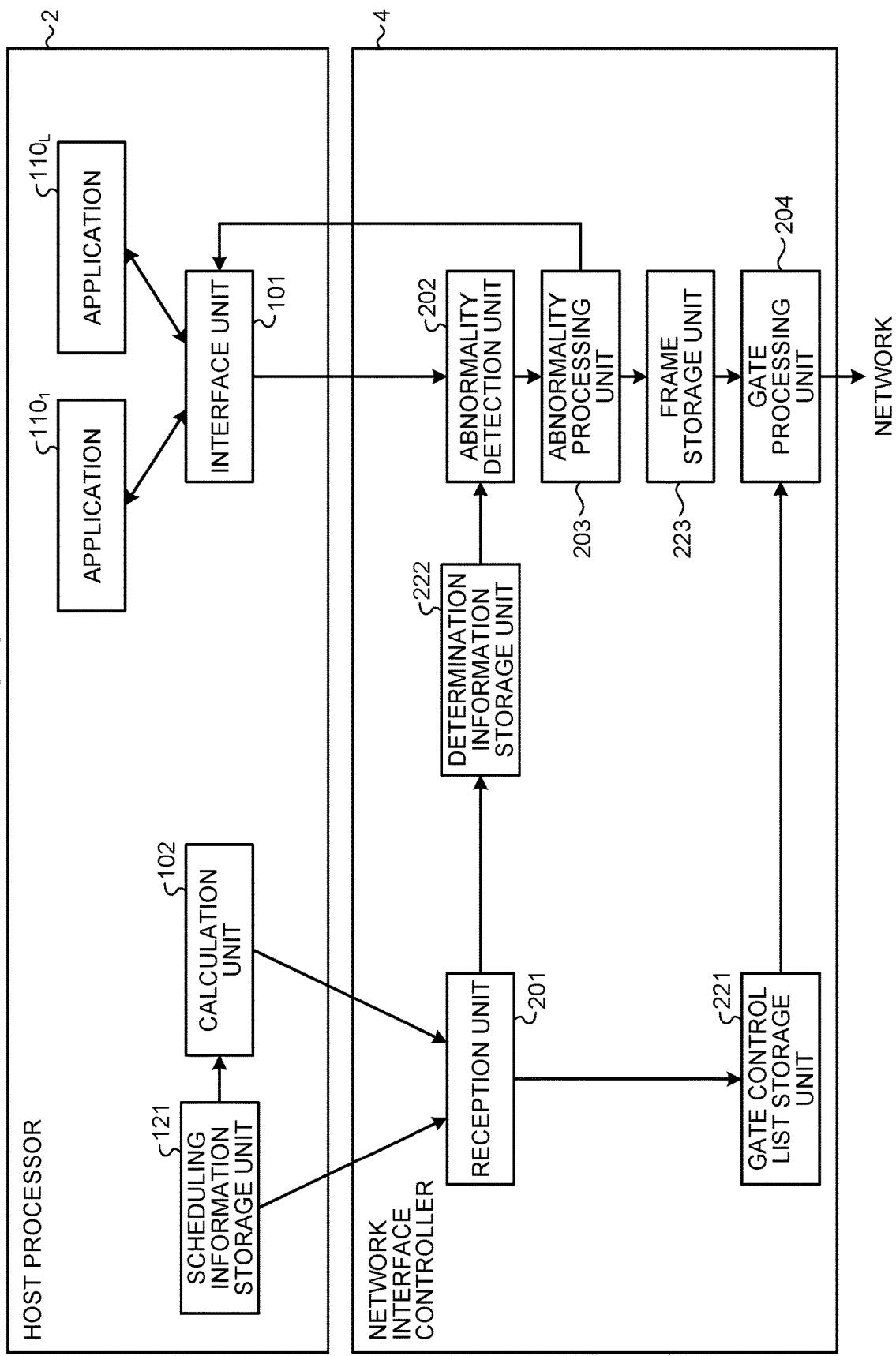
FIG. 3 is a functional block diagram of the communication device according to the first embodiment.

FIG. 3 is a block diagram illustrating an example of the functional configuration of the communication device 100 according to the first embodiment. Note that FIG. 3 mainly illustrates an example of a functional configurations of the host processor 2 (example of information processing device) and network interface controller 4 (example of communication control device) that are included in the communication device 100. Although only one network interface controller 4 is illustrated in FIG. 3, a plurality of the network interface controllers 4 may be provided as illustrated in FIG. 2.

As illustrated in FIG. 3, the host processor 2 includes a scheduling information storage unit 121, an interface unit 101, a calculation unit 102, and L applications $110_1$ to $110_L$ (L is an integer of 1 or more).

The scheduling information storage unit 121 stores scheduling information used for transmission control. The scheduling information includes, for example, the gate control list used to execute control of Enhancements for scheduled traffic that is defined in IEEE 802.1Q, and information other than the gate control list. The information other than the gate control list is, for example, the time at which gate control is started. The scheduling information storage unit 121 is implemented by, for example, a memory included inside the host processor 2. The scheduling information storage unit 121 may be implemented by the memory 1.

The gate control list may be stored in advance in the storage 3 to be used or, for example, may be input via the network 200 by using centralized network configuration (CNC) defined by IEEE 802.1Qcc.

FIG. 4 is a table illustrating an example of the gate control list. The gate control list illustrated in FIG. 4 includes six entries from T00 to T05. Each entry includes gate states of queues corresponding to eight traffic classes, and a time interval. TC0 to TC7 indicates traffic classes. For example, TC7 indicates the seventh traffic class. The gate states for the traffic classes are indicated by either "o" or "C". An opening gate is indicated by "o". A closed gate is indicated by "C". The gate states each indicates whether transmission in a queue for a traffic class is permitted.

The time interval indicates a duration of each entry. In the example of FIG. 4, the time interval of the entry T00 is set to 128 μs. This indicates that the entry T00 continues for 128 μs. The gate states are maintained during the corresponding time intervals sequentially from T00, and the gate states of the gates for the traffic classes are switched between "o" and "C" as time passes over T01, T02, . . . , T05. When the last entry (T05 in the example of FIG. 4) is finished, the process returns to T00, and the process is repeated.

Returning to FIG. 3, the interface unit 101 functions as an interface between the applications $110_1$ to $110_L$ (examples of upper-layer programs) and the network interface controller 4. The interface unit 101 may function as a network interface driver that is incorporated into a general-purpose operating system (OS) or the like.

The calculation unit 102 refers to the gate control list to calculate one or more indicators (determination information) used to detect presence of an abnormality. For example, the calculation unit 102 calculates the determination information for determining an abnormality caused by a situation in which a size of a message is larger than a size permitted to be transmitted by the queue (a maximum allowable size of a queue). The process of calculating the determination information will be described in detail later.

The applications $110_1$ to $110_L$ execute various information processing including a process of transmitting a message. When it is not necessary to distinguish between the applications $110_1$ to $110_L$, the applications will be simply referred to as an application 110.

Each of the above-described units (the interface unit 101, calculation unit 102, and application 110) is implemented by, for example, one or more processors. For example, each of the above-described units may be implemented by causing a processor such as a central processing unit (CPU) to execute a program, that is, by software. Each of the above-described units may be implemented by a processor such as a dedicated integrated circuit (IC), that is, by hardware. Each of the above-described units may be implemented by the software and the hardware in combination. When a plurality of processors is used, each of the processors may implement one of the units or may implement two or more of the units.

The network interface controller 4 includes a reception unit 201, an abnormality detection unit 202, an abnormality processing unit 203, a gate processing unit 204, a gate control list storage unit 221, a determination information storage unit 222, and a frame storage unit 223.

The gate control list storage unit 221 stores a gate control list received from the host processor 2.

The determination information storage unit 222 stores an abnormal frame size received from the host processor 2. The abnormal frame size is an example of determination information. The abnormal frame size is calculated for each transmission queue. Accordingly, the determination information storage unit 222 stores an abnormal frame size for each transmission queue.

The frame storage unit 223 stores a frame (transmission frame) as a transmission target received from the host processor 2.

The reception unit 201 receives an input of various information transmitted from the host processor 2. For example, the reception unit 201 receives a gate control list and determination information (abnormal frame size).

The abnormality detection unit 202 detects an abnormality in a frame received from the interface unit 101. The abnormality detection unit 202 detects an abnormality by using an abnormal frame size stored in the determination information storage unit 222.

When an abnormality of a frame is detected, the abnormality processing unit 203 performs abnormality processing depending on the detected abnormality. The abnormality processing includes exception handling process in order to resolve the abnormality depending on characteristics of the detected abnormality. When no abnormality is detected, the abnormality processing unit 203 stores a received frame in the frame storage unit 223, for transmission of the frame.

The gate processing unit 204 performs a frame transmission process in accordance with a gate control list. The gate processing unit 204 may function as a time-aware shaper defined in IEEE 802.1Qbv. The gate processing unit 204 performs, for example, reading a gate control list, controlling each transmission gate, determination processing for a guard band, transmission selection, extracting a frame from each transmission queue and transferring the frame, and the like.

Each of the above-described units (the reception unit 201, the abnormality detection unit 202, the abnormality processing unit 203, and the gate processing unit 204) is implemented by, for example, one or more processors. For example, each of the above-described units may be implemented by causing a processor such as a CPU to execute a program, that is, by software. Each of the above-described units may be implemented by a processor such as a dedicated IC, that is, by hardware. Each of the above-described units may be implemented by the software and the hardware in combination. When a plurality of processors is used, each of the processors may implement one of the units or may implement two or more of the units.

As illustrated in FIG. 3, the calculation unit 102 of the host processor 2 is connected to the reception unit 201. The abnormality detection unit 202 and the abnormality processing unit 203 are located on a data path between the interface unit 101 and the frame storage unit 223. The reception unit 201 and the abnormality detection unit 202 are connected via the determination information storage unit 222. Furthermore, the abnormality processing unit 203 and the interface unit 101 are connected in order to feed abnormality information (information about an abnormal frame) back.

The abnormality information includes, for example, the following pieces of information.

Information about an application 110 requesting frame transmission

Information about timing at which a request for frame transmission has occurred

Information included in the header of a frame

Information about frame priority

Information about the size of a frame

Information about a transmission queue (identification information, etc.)

Information about a frame size that is permitted to be transmitted from a transmission queue Next, the process of calculating the determination information will be described in detail. In the following, an example of calculating an abnormal frame size as the determination information is described.

First, the calculation unit 102 makes advance preparations for calculating the abnormal frame size for each transmission queue. Specifically, the calculation unit 102 uses a gate state and time interval of a gate control list stored in the scheduling information storage unit 121 to calculate a continuous gate open duration ("continuousopenduration"; COD) for each transmission queue. The continuous open duration indicates a time period during which the gate remains open. The continuous open duration can be also referred to as a time in which a message is permitted to be transmitted during a period corresponding to one or more continuous entries.

FIG. 5 is a table illustrating an example of the continuous open duration calculated from the gate control list of FIG. 4. For example, in the entry T02 for the traffic class TC7, the gate state continues "o" over T02 to T03 and changes to "C" in T04. The time intervals for T02 and T03 are 512 μs and 128 μs, respectively, and thus, "o" continues for 512+128=640 μs, from the beginning of T02. Likewise, the gate state changes to "C" in T04, and thus, "o" continues for 128 μs in T03. Note that after the last entry, the gate control list returns to the first entry. In T05, "o" continues over T05 to T00, and thus, "o" continues for 512+128=640 μs. When the gate state is always "o" as in the traffic class TC0, the continuous open duration is infinite (∞) because "o" continues unless the gate control list is changed.

Figure 6:
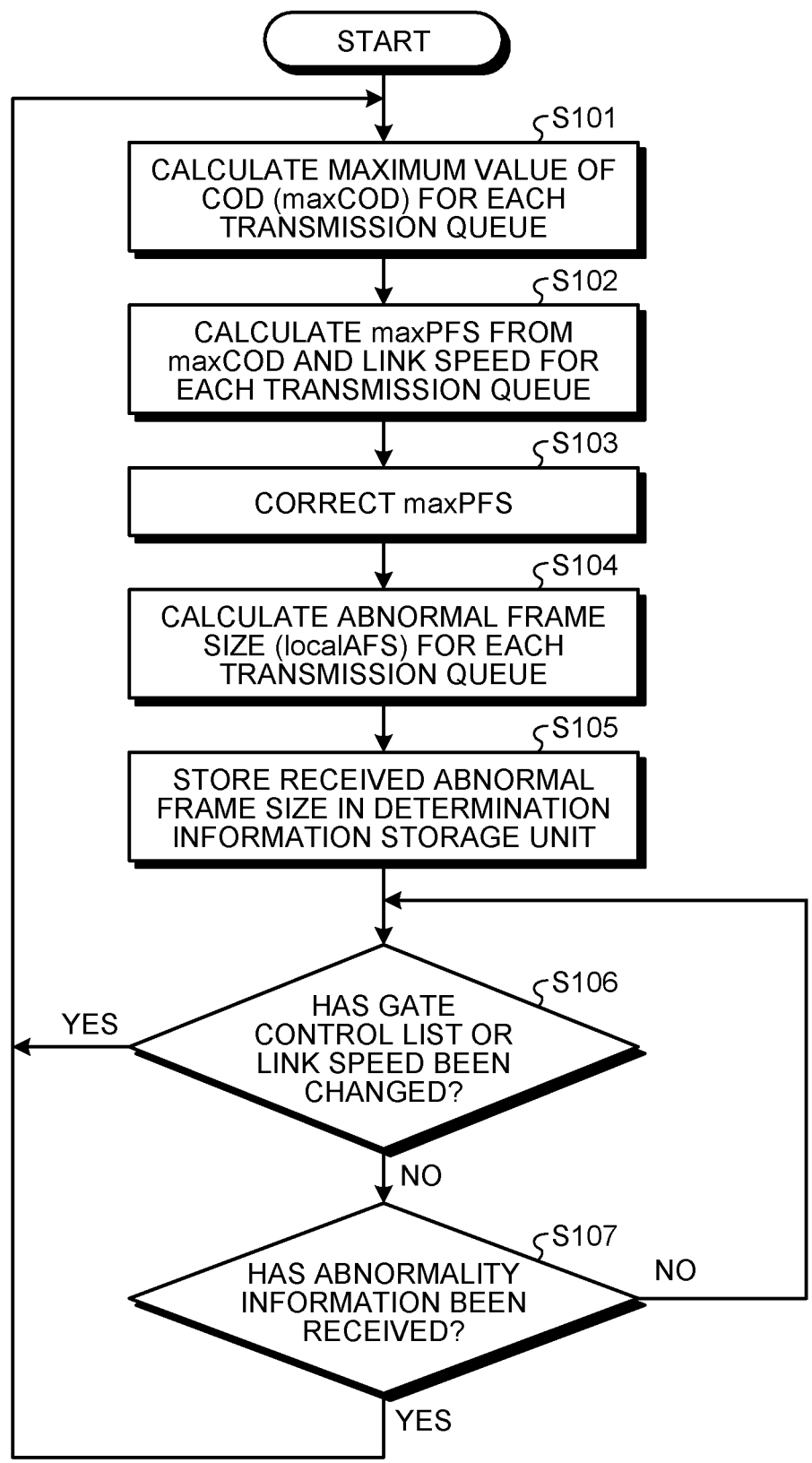
FIG. 6 is a flowchart of a calculation process for an abnormal frame size.

Next, calculation of the abnormal frame size will be described with reference to FIG. 6. FIG. 6 is a flowchart illustrating an example of a calculation process for the abnormal frame size (determination information). Note that in the following example, eight transmission queues (traffic classes) are identified by identification information ("qid") indicated by numerical values 0 to 7. The number of transmission queues and the identification method are not limited to this example.

The calculation unit 102 calculates a maximum continuous open duration ("maximumContinuousOpenDuration"; maxCOD) for each transmission queue (Step S101). The calculation unit 102 uses the maxCOD in each transmission queue and the link speed (communication speed) of the network to calculate a maximum frame size ("maximumPermissibleFrameSize"; maxPFS) that is permitted to be normally transmitted from each transmission queue for each transmission queue (Step S102). For example, when the maxCOD in the i-th transmission queue (i is an integer of 0 to 7) is 1024 nanoseconds and the link speed is 1 Gbps, the value of the maxPFS of the i-th transmission queue can be calculated as in the following formula (1).

$$\text{maxPFS}_i = 1024 \times 10^{-9} \times 10^9 (bps)/8 = 128 (\text{byte}) \quad (1)$$

At this time, the calculation unit 102 may correct the value of maxPFS in each transmission queue in consideration of the number of bits of media-dependent overhead (Step S103). The media-dependent overhead includes, for example, an inter-packet gap set at a terminal end according to communication medium, a preamble, and the like. For example, when the total number of bits of the media-dependent overhead is 20 bytes, a corrected value of maxPFS is 128−20=108 bytes in the above example.

Next, the calculation unit 102 calculates the abnormal frame size ("localAbnormalFrameSize"; localAFS) in each transmission queue on the basis of the value of maxPFS in each transmission queue according to the following formula (2) (Step S104).

$$\text{localAFS}_i = \min(\text{maxPFS}_i, \text{queueMax}SDU_i) + 1 \quad (2)$$

localAFS$_i$ is the value of localAFS in the i-th transmission queue. maxPFS$_i$ is the value of maxPFS in the i-th transmission queue. queueMaxSDU$_i$ is the value of queueMaxSDU in the i-th transmission queue.

In the calculation according to formula (2), the calculation unit 102 calculates the value of localAFS in each transmission queue from the values of maxPFS and queueMaxSDU in each transmission queue. Specifically, the calculation unit 102 compares maxPFS and queueMaxSDU in each transmission queue to each other and selects a smaller value.

After that, the calculation unit 102 adds a value of the minimum unit of transmission data size (example: 1 byte, 1 bit, etc.) to this selected value to calculate localAFS. Formula (2) is an example when the value indicating the minimum unit is 1. When the value indicating the minimum unit of the transmission data size is other than 1, the value to be added in formula (2) may be adjusted according to the minimum unit of the transmission data size. For example, when the value indicating the minimum unit is 8 (8 bytes, 8 bits, etc.), the calculation unit 102 may calculate the abnormal frame size according to the following formula (3).

$$\text{localAFS}_i = \min(\text{maxPFS}_i, \text{queueMax}SDU_i) + 8 \quad (3)$$

Assuming that the corrected value of maxPFS in the i-th transmission queue is 108 bytes (maxPFS$_i$=108) and further that the value of queueMaxSDU in the i-th transmission queue is 1500 bytes (queueMaxSDU$_i$=1500), the calculation unit 102 is operable to calculate localAFS in the i-th transmission queue as shown in the following formula (4).

$$\text{localAFS}_i = \min(108,1500) + 1 = 109(\text{byte}) \quad (4)$$

When maxPFS is not corrected, the calculation unit 102 is operable to calculate localAFS as shown in the following formula (5).

$$\text{localAFS}_i = \min(128,1500) + 1 = 129(\text{byte}) \quad (5)$$

In this way, for example, when the number of bits of media-dependent overhead is considered in calculating the guard band defined in IEEE 802.1Qbv, the value of localAFS (109 bytes) calculated on the basis of the corrected maxPFS may be adopted. Furthermore, for example, when the number of bits of media-dependent overhead is not taken into consideration in calculating the guard band, the value of localAFS (129 bytes) calculated on the basis of maxPFS before correction may be adopted.

The calculation unit 102 outputs the abnormal frame size calculated in this way to the network interface controller 4 (reception unit 201).

The reception unit 201 of the network interface controller 4 receives a result of the calculation of the abnormal frame size and stores the result in the determination information storage unit 222 (Step S105). At this time, the reception unit 201 may receive the value of maxPFS in each transmission queue, as information about the size of the abnormal frame.

Then, the calculation unit 102 determines whether the gate control list or the link speed has been changed (Step S106). In response to determining that the gate control list or the link speed has been changed (Step S106: Yes), the process returns to Step S101, and the calculation unit 102 recalculates the abnormal frame size by using an updated new value.

On the other hand, in response to determining that the gate control list or the link speed is not changed (Step S106: No), the calculation unit 102 determines whether abnormality information has been received from another communication device 100 or the control device 300 (Step S107). When the abnormality information has been received (Step S107: Yes), the calculation unit 102 returns to Step S101 and updates the value of the abnormal frame size as necessary.

As described above, the abnormality information includes, for example, the identification information of a transmission queue in which an abnormality is detected, the abnormal frame size (remoteAFS) in the transmission queue in which abnormality is detected, and the like.

The calculation unit 102 is operable to update the value of the abnormal frame size on the basis of the following formula (6).

$$\text{localAFSNew}_i = \min(\text{localAFS}_i, \text{remoteAFS}_i) \quad (6)$$

localAFSNew$_i$ indicates a new value of localAFS in the i-th transmission queue. localAFS$_i$ indicates the value of current localAFS in the i-th transmission queue. remoteAFS$_i$ indicates the value of remoteAFS in the i-th transmission queue that is received from an external communication device or the like.

The calculation unit 102 uses the values of current localAFS and remoteAFS to calculate a new value of value of localAFS according to formula (6). Specifically, the calculation unit 102 compares the values of localAFS$_i$ and remoteAFS$_i$ to each other and adopts a smaller value as localAFSNew$_i$.

The calculation unit 102 may determine at least one of the initial value of queueMaxSDU and an updated value of queueMaxSDU, on the basis of the determination information. The updated value of queueMaxSDU means, for example, a new value for updating a set value of queueMaxSDU that has already been set. For example, when the value of queueMaxSDU is permitted to be updated for each transmission queue, queueMaxSDU in each transmission queue may be adjusted by using localAFS calculated according to formulas (2) and (6). For example, the calculation unit 102 is configured to determine a new value of queueMaxSDU (queueMaxSDUNew) on the basis of formula (7).

$$\text{queueMaxSDUNew}_i = \min(\text{localAFS}_i - 1, \text{queueMaxSDU}_i) \quad (7)$$

queueMaxSDUNew$_i$ indicates the new value of queueMaxSDU in the i-th transmission queue. localAFS$_i$ indicates the value of localAFS in the i-th transmission queue. queueMaxSDU$_i$ indicates the current value of queueMaxSDU in the i-th transmission queue.

The calculation unit 102 uses the values of localAFS and queueMaxSDU to calculate a new value (queueMaxSDUNew) of queueMaxSDU according to formula (7). Specifically, the calculation unit 102 subtracts the value of the minimum unit of transmission data size (example: 1 byte, 1 bit, etc.) from localAFS$_i$. Then, the calculation unit 102 compares the value obtained after subtraction with the value of queueMaxSDU$_i$ and adopts a smaller value as queueMaxSDUNew$_i$.

When the value indicating the minimum unit of the transmission data size is other than 1, the value to be subtracted from localAFS may be adjusted according to the minimum unit of the transmission data size, as in the description of formula (2). For example, when the value indicating the minimum unit is 8 (8 bytes, 8 bits, etc.), the calculation unit 102 may calculate a new value of queueMaxSDU value using the following formula (8).

$$\text{queueMaxSDUNew}_i = \min(\text{localAFS}_i - 8, \text{queueMaxSDU}_i) \quad (8)$$

The calculation unit 102 is configured to calculate the initial value of queueMaxSDU by using, for example, the following formula (9).

$$\text{queueMaxSDU}_i = \text{maxPFS}_i \quad (9)$$

The method of calculating the initial value is not limited to this. For example, the calculation unit 102 may set a value specified by the control device 300 as the initial value or may determine the initial value on the basis of the maximum transmission unit (MTU) of the network.

Determining the value of localAFS or queueMaxSDU according to the calculation method described above makes it possible, for example, to detect a frame (potential abnormal frame) that may be determined as an abnormal frame by a relay node (communication device such as a switch) on a communication path between terminal nodes, in an early stage. In other words, it becomes possible to identify a potential abnormal frame at a transmission node or relay node closer to the transmission node and handle the potential abnormal frame. This makes it possible to efficiently use a band on the communication path, and a computation resource, buffer area, and the like of the relay node.

Furthermore, in the present embodiment, it is possible to determine an individual value (may be the same value or different value) of queueMaxSDU for each transmission queue according to formulas (7) to (9). Therefore, it is possible to detect the abnormality with higher accuracy.

Figure 7:
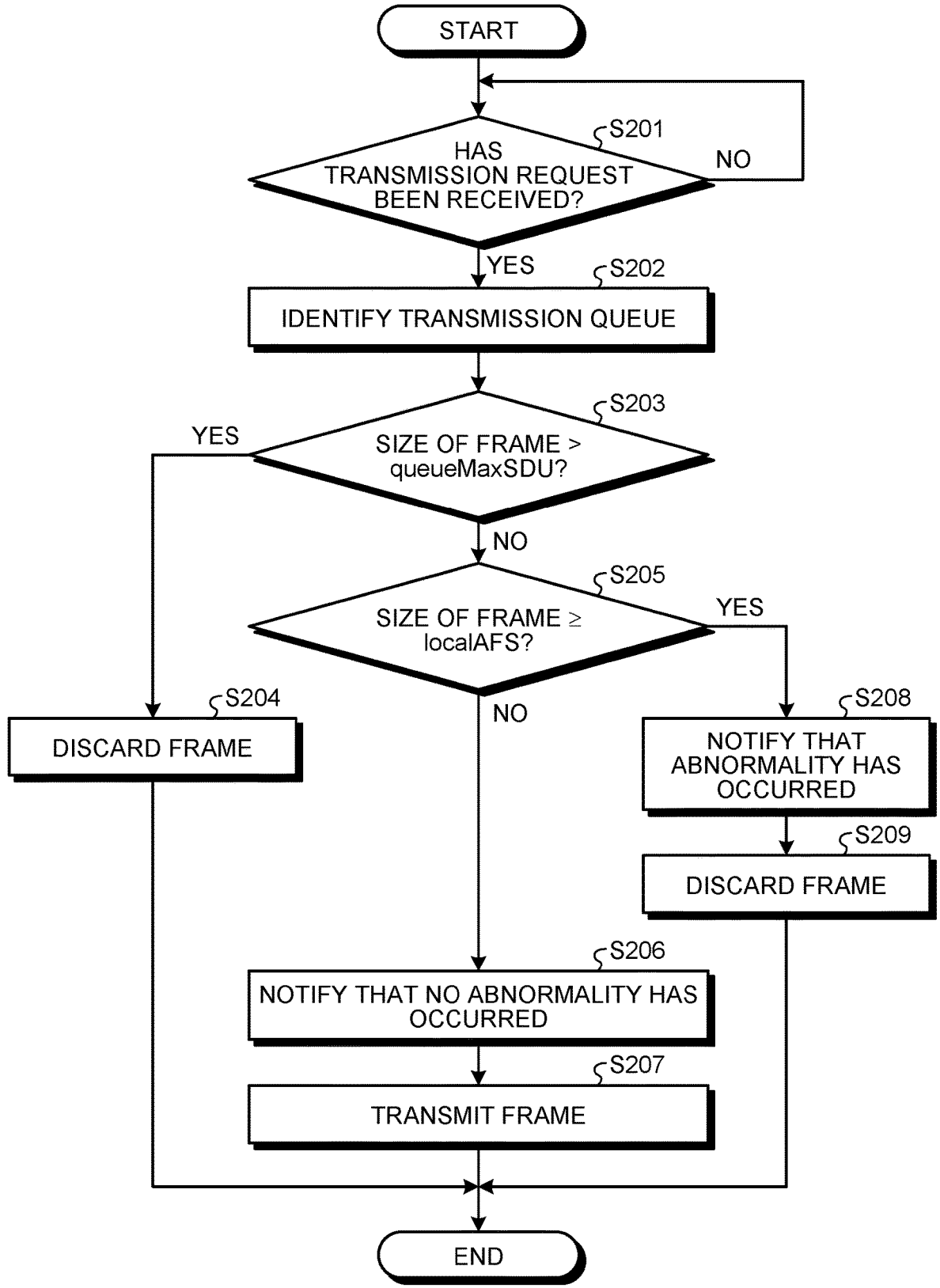
FIG. 7 is a flowchart of a frame transmission process.

Next, detection of abnormal frame and abnormality processing when the abnormal frame is detected will be described. FIG. 7 is a flowchart illustrating an example of a frame transmission process including the abnormality processing and the like.

When an application 110 running on the host processor 2 attempts to transmit a new frame, the interface unit 101 issues a transmission request for the frame. Furthermore, for example, also when a frame received from another communication device 100 is transferred to still another communication device 100, the transmission request for the frame is issued.

The abnormality detection unit 202 determines whether the transmission request for the frame has been received (Step S201). When not received (Step S201: No), the process is repeated until the transmission request for the frame is received. When the transmission request for the frame has been received (Step S201: Yes), the abnormality detection unit 202 receives the frame for which the transmission request has been made, from the interface unit 101 and identifies a transmission queue into which the received frame is inserted (Step S202).

For example, the abnormality detection unit 202 refers to the identification information ("qid") of the transmission queue directly specified from the interface unit 101, the header of the frame, or the like to identify the transmission queue. For example, the abnormality detection unit 202 may determine the priority from the value of a priority code point (PCP) of a virtual local area network (VLAN) tag of the frame to identify the transmission queue associated with the priority.

Next, the abnormality detection unit 202 compares the size of the received frame with the value of queueMaxSDU of the identified transmission queue and determines whether to discard the frame. For example, the abnormality detection unit 202 determines whether the size of the frame is larger than the queueMaxSDU (Step S203). When the size of the frame is larger than queueMaxSDU (Step S203: Yes), the abnormality processing unit 203 discards the frame (Step S204) and finishes the process.

When the size of the frame is equal to or smaller than queueMaxSDU (Step S203: No), the abnormality detection unit 202 compares the size of the frame with the localAFS in the identified transmission queue and determines whether the frame to be transmitted is an abnormal frame that may cause a temporary deadlock state. For example, the abnormality detection unit 202 determines whether the size of the frame is equal to or larger than localAFS (Step S205). The abnormality detection unit 202 may detect an abnormality by using maxPFS received as the information about the size of the abnormal frame, instead of localAFS.

When the size of the frame is smaller than localAFS (Step S205: No), the abnormality detection unit 202 passes the frame to the abnormality processing unit 203 and notifies that no abnormality has occurred (Step S206). Thus, the received frame is regarded as a normal frame and the transmission process is continued. In other words, the abnormality processing unit 203 inserts the frame into a transmission queue in the frame storage unit 223, performs a normal frame transmission process (Step S207), and finishes the process.

When the size of the frame is equal to or larger than localAFS (Step S205: Yes), the abnormality detection unit 202 passes the frame to the abnormality processing unit 203 and notifies that an abnormality has occurred (Step S208). Furthermore, the abnormality processing unit 203 may notify another communication device 100, the control device 300, or the like of abnormality information over the network. The process of notifying of the abnormality information will be described in detail later. Then, the abnormality processing unit 203 discards the abnormal frame (Step S209) and finishes the process.

Figure 8:
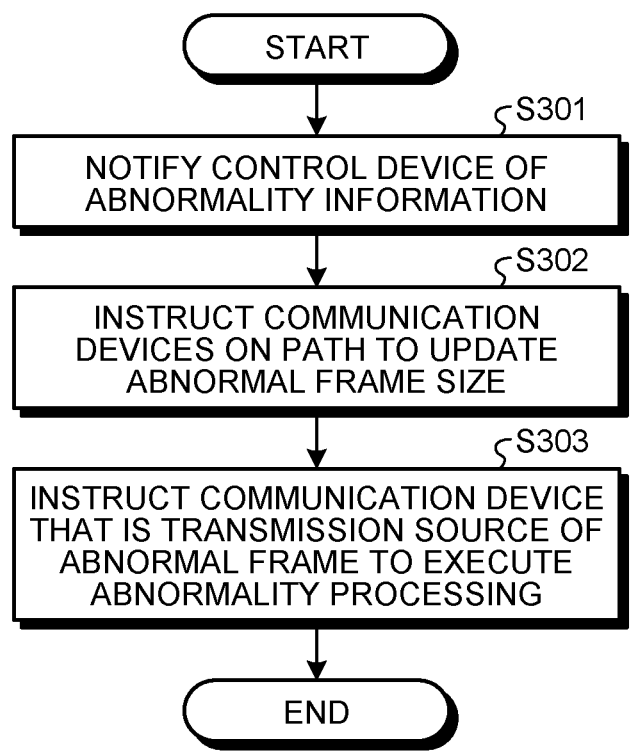
FIG. 8 is a flowchart of an abnormality notification process.

Next, the process of notifying of the abnormality information will be described. FIG. 8 is a flowchart illustrating an example of an abnormality notification process.

The abnormality processing unit 203 notifies the control device 300 of abnormality information (Step S301). The control device 300 receiving the notification instructs the other communication devices 100 on the communication path to update the abnormal frame size (Step S302). For example, the control device 300 transmits an update instruction including the identification information of a transmission queue from which an abnormality is detected, information indicating new updated abnormal frame size, and the like, to the other communication devices 100. Furthermore, the control device 300 instructs a communication device 100 that is a transmission source of an abnormal frame to perform abnormality processing (Step S303).

Figure 9:
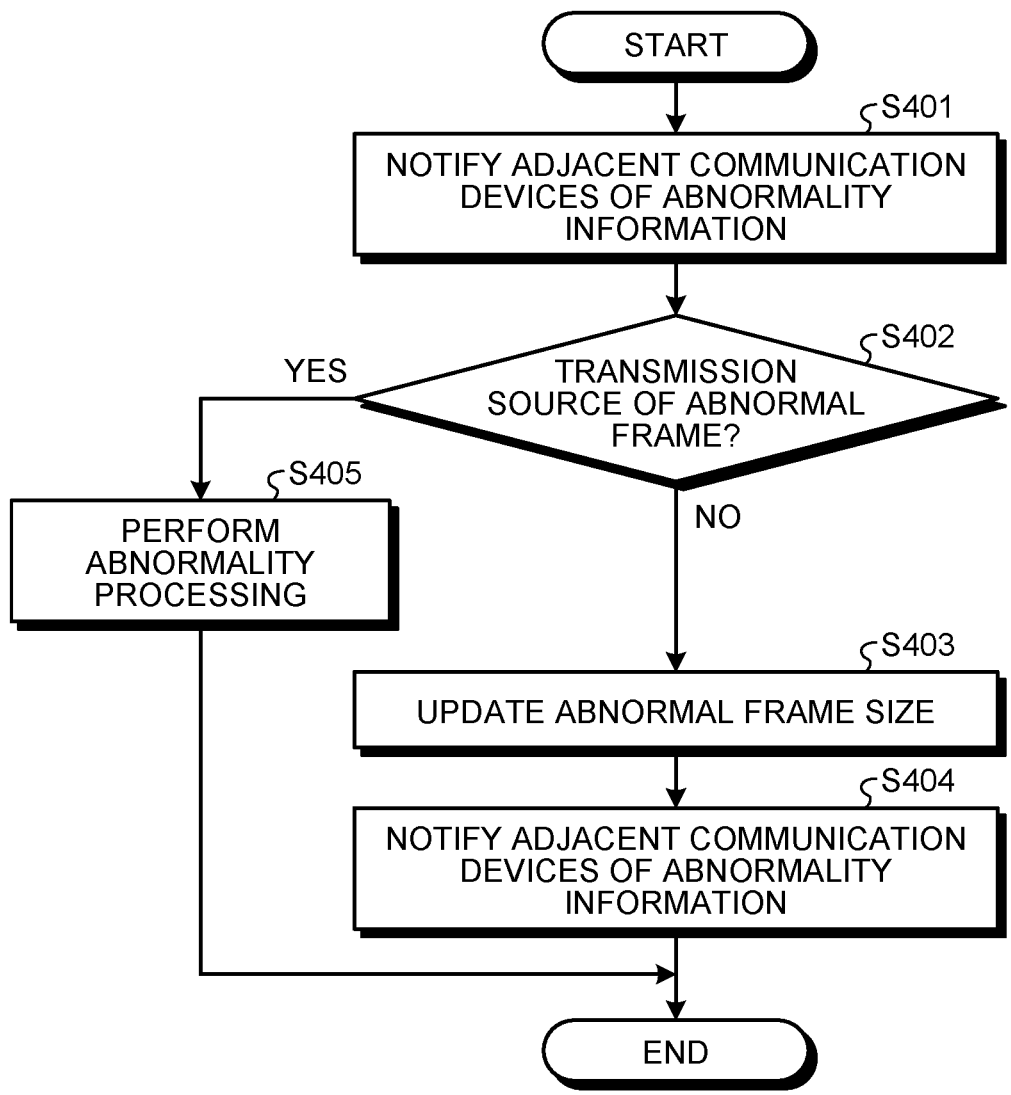
FIG. 9 is a flowchart of an abnormality notification process.

FIG. 8 illustrates an example of the abnormality notification process performed when the control device 300 manages the abnormality processing and the like. The abnormality processing may be performed by transmitting and receiving information between the communication devices 100, instead of using the control device 300. Note that in this configuration, the information processing system may be configured without the control device 300. FIG. 9 is a flowchart illustrating another example of the abnormality notification process.

When an abnormality is detected by the abnormality detection unit 202 of a certain communication device 100, the abnormality processing unit 203 of the communication device 100 notifies other adjacent communication devices 100 of abnormality information (Step S401). The abnormality processing unit 203 of a communication device 100 that has received the notification determines whether the communication device 100 itself is a transmission source of a frame from which the abnormality is detected (Step S402). For example, the abnormality processing unit 203 refers to information about an application 110, information in the header of the frame, and the like that are included in the abnormality information to determine whether the communication device 100 itself is the transmission source of the frame.

When the communication device 100 itself is the transmission source of the frame (Step S402: Yes), the abnormality processing unit 203 performs abnormality processing for a frame transmitted (Step S405). When the communication device 100 itself is not the transmission source of the frame (Step S402: No), the abnormality processing unit 203 updates the abnormal frame size, for example, according to formula (6) described above (Step S403). Furthermore, the abnormality processing unit 203 further notifies other adjacent communication devices 100 of the abnormality information (Step S404).

First Modification

In a case where updating the value of queueMaxSDU in each transmission queue is permitted, the value of queueMaxSDUNew$_i$ calculated, for example, according to formula (7) described above may be used to detect an abnormality. In other words, an abnormality may be detected by using only the updated value of queueMaxSDUNew$_i$ without using localAFS.

Figure 10:
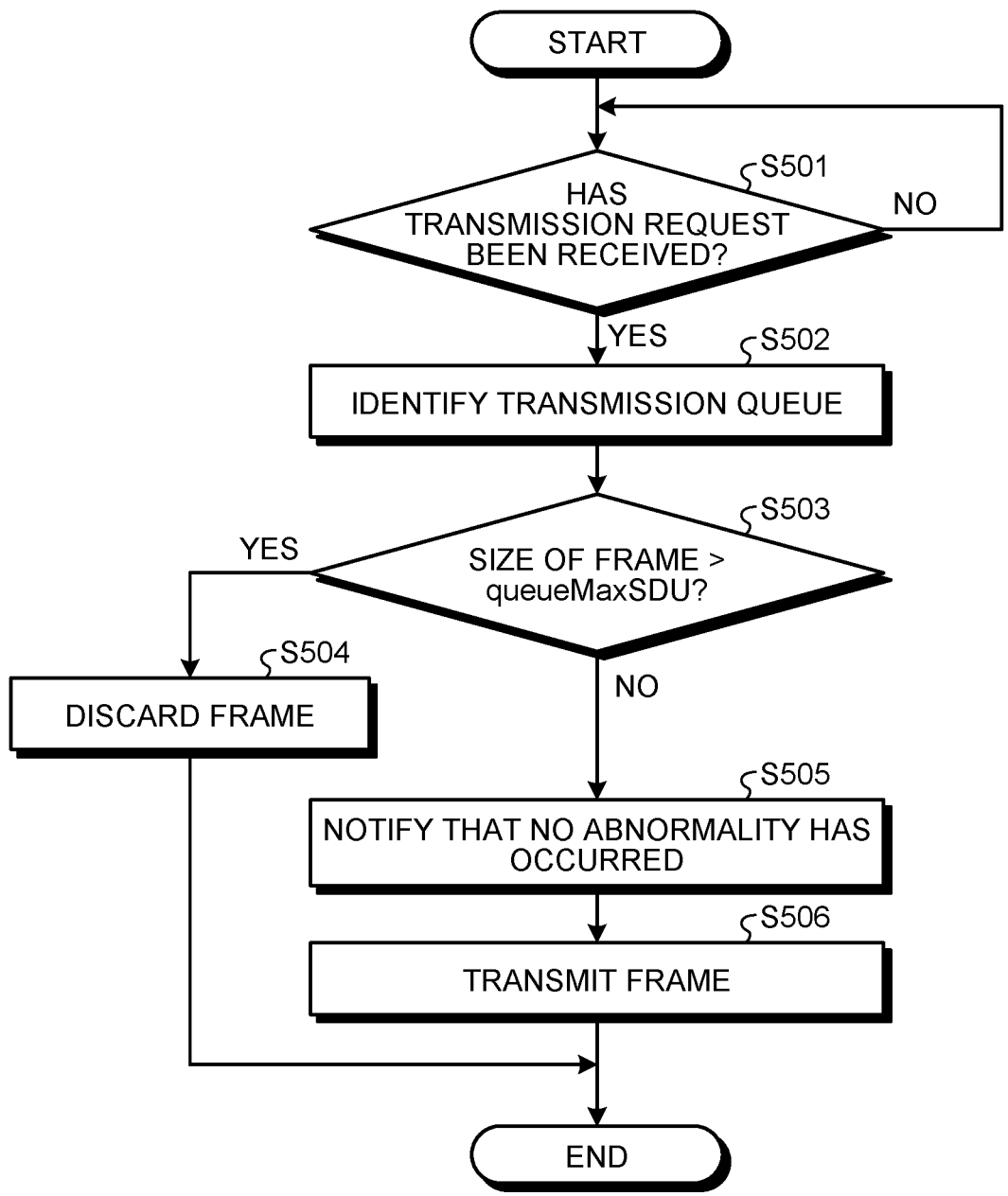
FIG. 10 is a flowchart of a frame transmission process according to a modification of the first embodiment.

FIG. 10 is a flowchart illustrating an example of the frame transmission process according to a first modification configured in this way. Steps S501 to S504 are similar to Steps S201 to S204 of FIG. 7, and description thereof will be omitted.

In the present modification, when the size of a frame is equal to or smaller than queueMaxSDU (Step S203: No), the abnormality detection unit 202 passes the frame to the abnormality processing unit 203 and notifies that no abnormality has occurred (Step S505). Thus, the received frame is regarded as a normal frame and the transmission process is continued. In other words, the abnormality processing unit 203 inserts the frame into a transmission queue in the frame storage unit 223, performs a normal frame transmission process (Step S506), and finishes the process.

According to the first modification, queueMaxSDU is dynamically updatable according to a gate control list, link speed, or the like. In other words, for example, the value of queueMaxSDU can be set in consideration of TimeInterval of the gate opening state. This makes it possible to more appropriately determine discarding of a frame and avoid the occurrence of a deadlock state.

Second Modification

Figure 11:
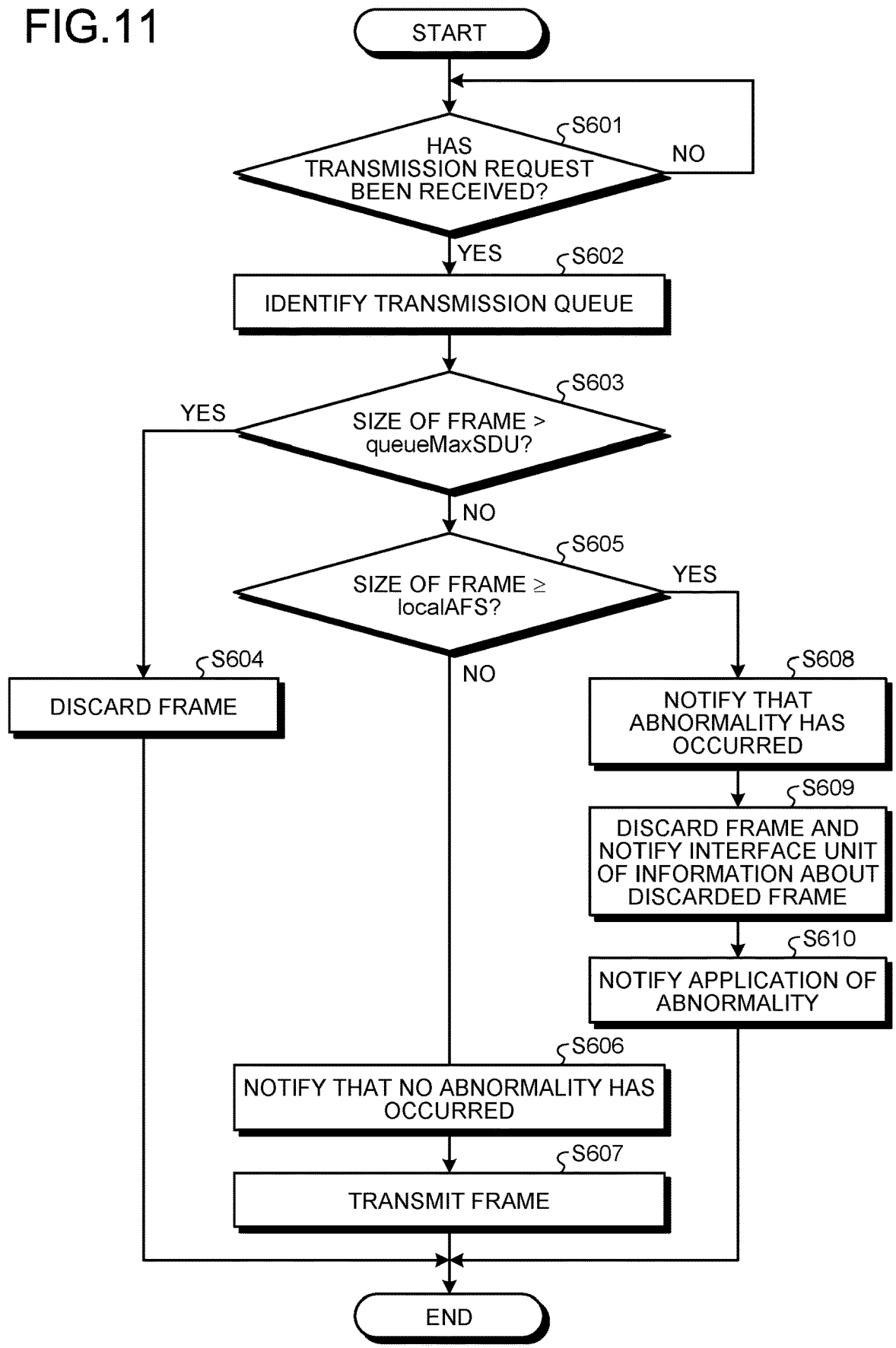
FIG. 11 is a flowchart of a frame transmission process according to a modification of the first embodiment.

In a second modification, the abnormality processing unit 203 discards an abnormal frame and notifies an application 110 of information about the abnormal frame. FIG. 11 is a flowchart illustrating an example of the frame transmission process according to the second modification. Steps S601 to S608 are similar to Steps S201 to S208 of FIG. 7, and description thereof will be omitted.

In the present modification, the abnormality processing unit 203 discards the abnormal frame and notifies an upper interface, that is, the interface unit 101, of information about the discarded frame (Step S609). The interface unit 101 notifies the application 110 that issued the transmission request for the abnormal frame of the abnormality (Step S610).

This makes it possible to cause the application 110 that is a transmission source of the abnormal frame to take necessary measures. For example, it is possible for the application 110 to adjust the abnormal frame to have a size smaller than localAFS before transmitting the frame again. Furthermore, when the size of the abnormal frame is equal to or larger than localAFS, the application 110 may divide the abnormal frame into a plurality of normal frames for transmission. At this time, the application 110 adjusts each of the divided frames to have a size smaller than localAFS.

Alternatively, the application 110 may attempt to transmit the abnormal frame again by using a different transmission queue. At this time, the application 110 checks the value of localAFS in each transmission queue and selects a transmission queue so that the size of a frame for which transmission is attempted again is smaller than localAFS.

Third Modification

Figure 12:
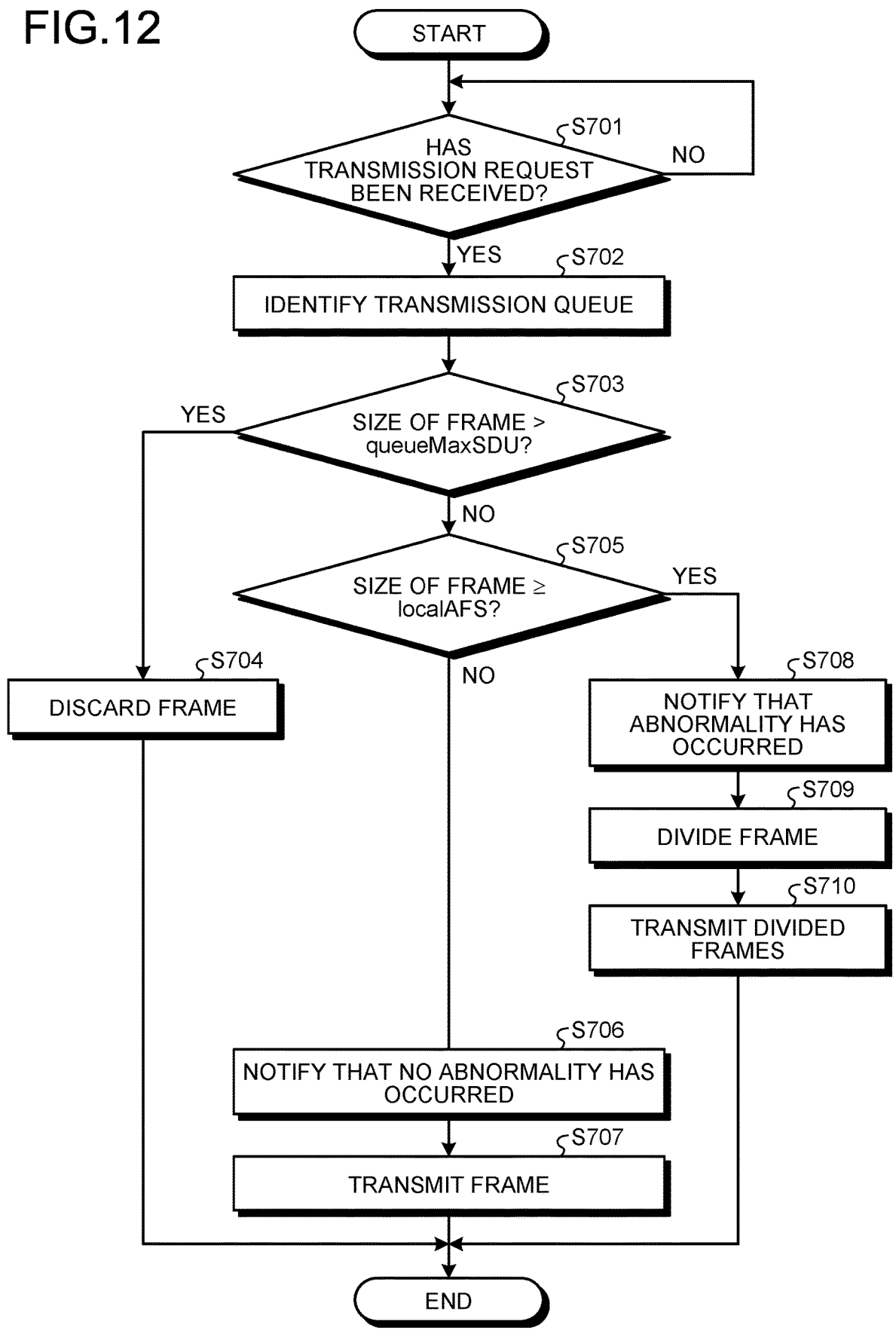
FIG. 12 is a flowchart of a frame transmission process according to a modification of the first embodiment.

In a third modification, the abnormality processing unit 203 divides and transmits an abnormal frame instead of discarding the abnormal frame. FIG. 12 is a flowchart illustrating an example of the frame transmission process according to the third modification. Steps S701 to S708 are similar to Steps S201 to S208 of FIG. 7, and description thereof will be omitted.

In the present modification, the abnormality processing unit 203 divides the abnormal frame into a plurality of normal frames by using the value of localAFS in a transmission queue with which the abnormal frame is to be transmitted (Step S709). At this time, the abnormality processing unit 203 adjusts each of the divided frames to have a size smaller than localAFS in the transmission queue. The abnormality processing unit 203 inserts the divided frames into a transmission queue in the frame storage unit 223, performs a normal frame transmission process (Step S710), and finishes the process.

Alternatively, the abnormality processing unit 203 may divide a frame by using frame preemption mechanism of IEEE 802.1Qbu. In this configuration, the abnormality processing unit 203 transfers an abnormal frame to MAC (preemptable MAC) that can perform preemption. The process of dividing the frame is performed inside the preemptable MAC. The preemptable MAC corresponds to a control unit (a controller) that divides a frame and transmits the frame.

As described above, the communication device 100 according to the first embodiment detects an abnormal frame that may cause a temporary deadlock state due to the constraint by the gate control list when transmitting a frame from each transmission queue, and processes the abnormal frame to avoid the deadlock state. This makes it possible to maintain the real-time performance of communication by transmission control based on IEEE 802.1Qbv.

Second Embodiment

Figure 13:
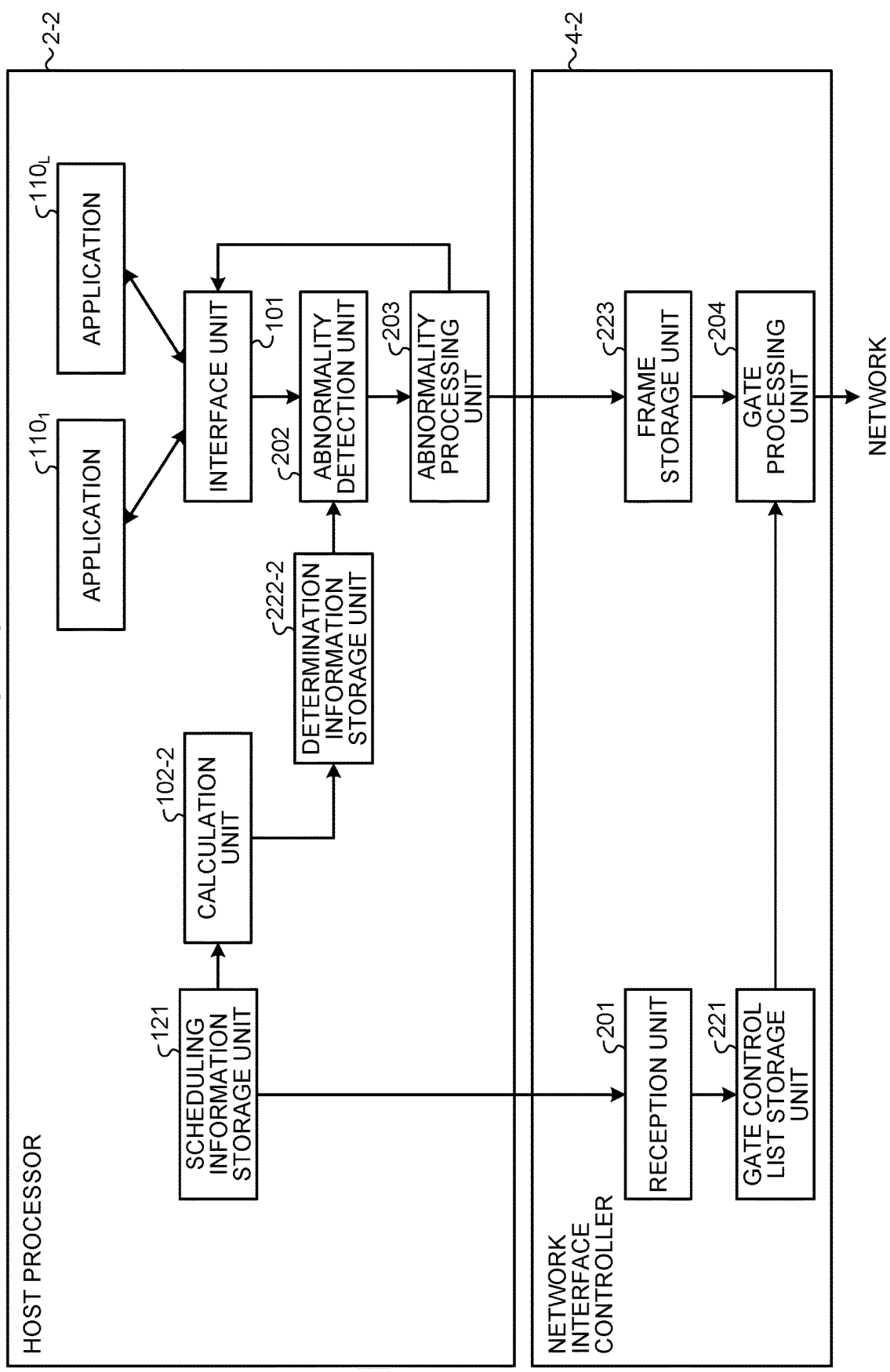
FIG. 13 is a functional block diagram of a communication device according to a second embodiment.

Some of the functions of the network interface controller may be included in the host processor. In a second embodiment, an example of the host processor that includes the abnormality detection unit, the abnormality processing unit, and the determination information storage unit will be described. FIG. 13 is a diagram illustrating an example of the functional configuration of a host processor 2-2 and a network interface controller 4-2 that are included in a communication device according to the second embodiment.

As illustrated in FIG. 13, the host processor 2-2 includes a scheduling information storage unit 121, an interface unit 101, a calculation unit 102-2, L applications $110_1$ to $110_L$, an abnormality detection unit 202, an abnormality processing unit 203, and a determination information storage unit 222-2. Furthermore, the network interface controller 4-2 includes a reception unit 201, a gate processing unit 204, a gate control list storage unit 221, and a frame storage unit 223.

The calculation unit 102-2 is different from the calculation unit 102 according to the first embodiment in that the calculation unit 102-2 stores calculated determination information (abnormal frame size) in the determination information storage unit 222-2 in the host processor 2-2.

The determination information storage unit 222-2 is different from the determination information storage unit 222 according to the first embodiment in that the determination information storage unit 222-2 receives and stores determination information output from the calculation unit 102-2 without using the reception unit 201.

The other configurations are the same as those in FIG. 3 illustrating the functional configurations of the first embodiment and thus denoted by the same reference numerals, and the description thereof will be omitted. Furthermore, the process performed by each unit is similar to that in the first embodiment (FIGS. 6 to 12), and description thereof will be omitted.

Fourth Modification

Figure 14:
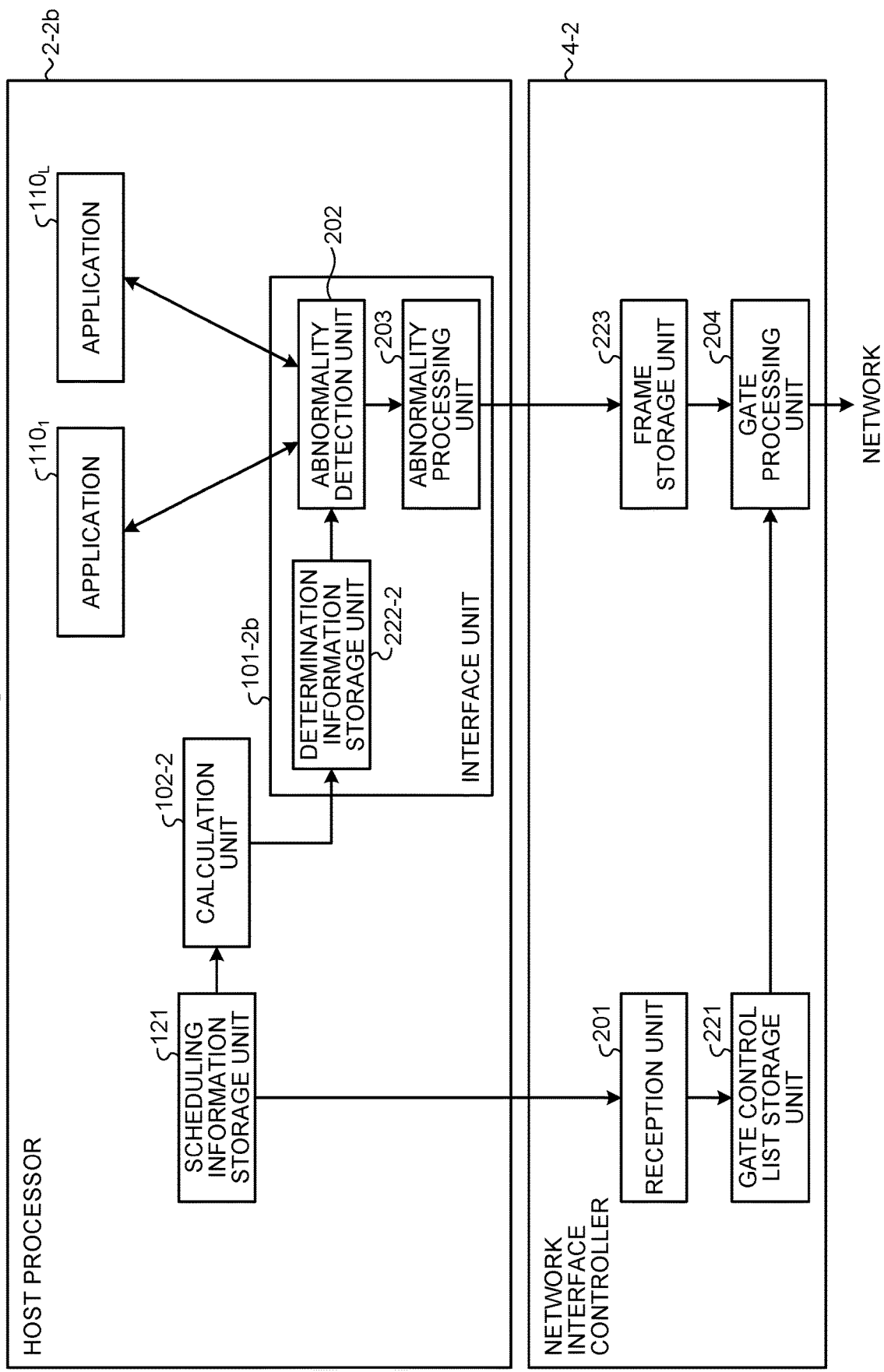
FIG. 14 is a functional block diagram of a communication device according to a modification of the second embodiment.

FIG. 14 is a diagram illustrating an example of the functional configuration of a host processor 2-2b and a network interface controller 4-2 that are included in a communication device according to a modification of the second embodiment. In the present modification, a determination information storage unit 222-2, an abnormality detection unit 202, and an abnormality processing unit 203 are implemented as internal functions of an interface unit 101-2b.

At this time, for example, a network interface driver incorporated in a general-purpose OS or the like may function as the interface unit 101-2b to perform abnormality detection (abnormality detection unit 202) and abnormality processing (abnormality processing unit 203).

As described above, in the communication system according to the second embodiment, arrangement of the units is different from that in the first embodiment, but similar functions to those in the first embodiment can be implemented.

Third Embodiment

Figure 15:
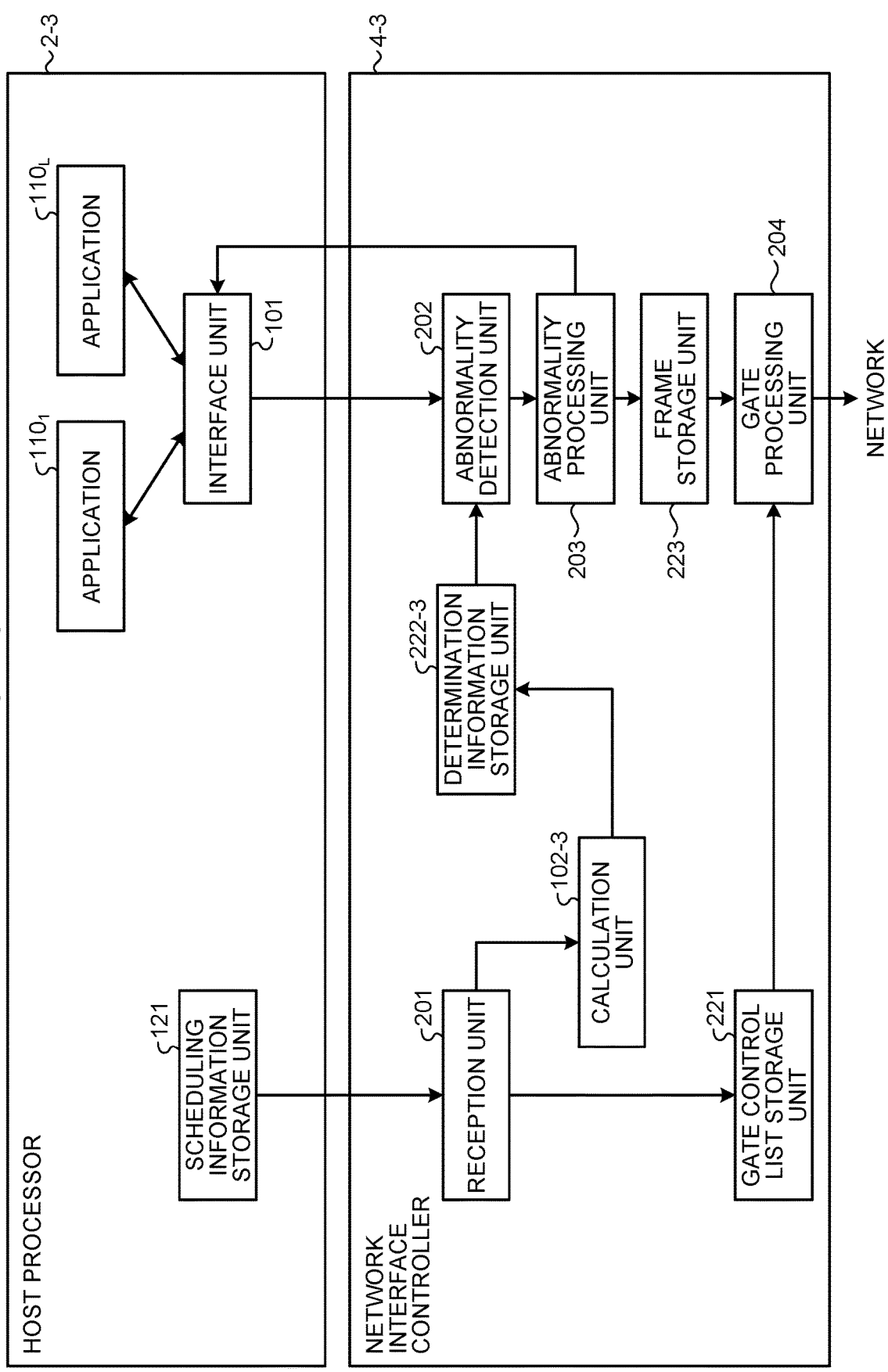
FIG. 15 is a functional block diagram of a communication device according to a third embodiment.

Some of the functions of the host processor may be included within the network interface controller. In a third embodiment, an example of the network interface controller that includes the calculation unit will be described. FIG. 15 is a diagram illustrating an example of the functional configuration of a host processor 2-3 and a network interface controller 4-3 that are included in a communication device according to the third embodiment.

As illustrated in FIG. 15, the host processor 2-3 includes a scheduling information storage unit 121, an interface unit 101, and L applications $110_1$ to $110_L$. Furthermore, the network interface controller 4-2 includes a calculation unit 102-3, a reception unit 201, an abnormality detection unit 202, an abnormality processing unit 203, a gate processing unit 204, a gate control list storage unit 221, a determination information storage unit 222-3, and a frame storage unit 223.

The calculation unit 102-3 is different from the calculation unit 102 according to the first embodiment in that the calculation unit 102-3 calculates determination information with reference to a gate control list input via the reception unit 201 and stores the determination information in the determination information storage unit 222-3.

The determination information storage unit 222-3 is different from the determination information storage unit 222 according to the first embodiment in that the determination information storage unit 222-3 receives and stores the determination information output from the calculation unit 102-3 without using the reception unit 201.

The other configurations are the same as those in FIG. 3 illustrating the functional configurations of the first embodiment and thus denoted by the same reference numerals, and the description thereof will be omitted. Furthermore, the process performed by each unit is similar to that in the first embodiment (FIGS. 6 to 12), and description thereof will be omitted.

Fifth Modification

Figure 16:
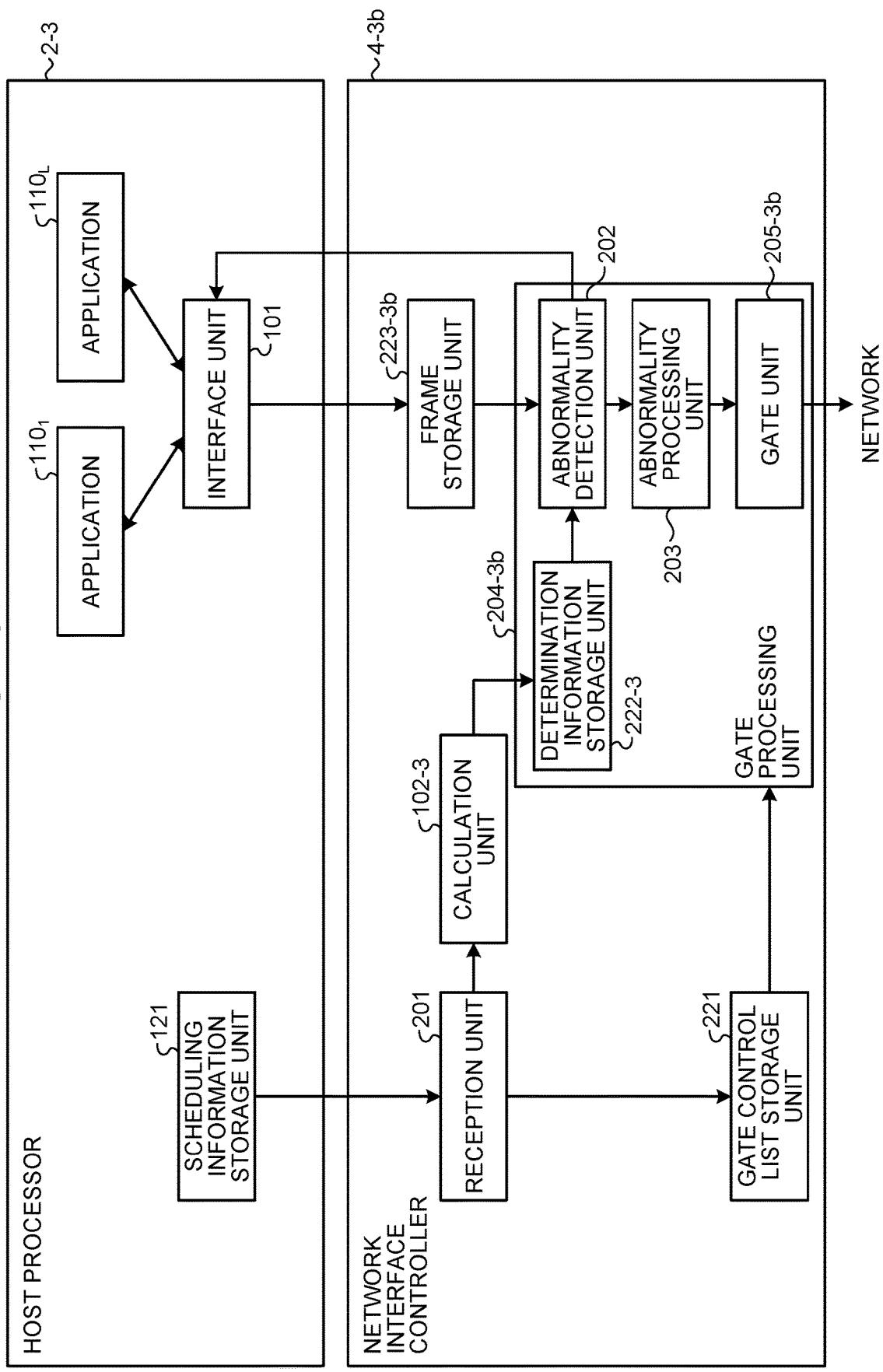
FIG. 16 is a functional block diagram of a communication device according to a modification of the third embodiment.

FIG. 16 is a diagram illustrating an example of the functional configuration of a host processor 2-3 and a network interface controller 4-3b that are included in a communication device according to a modification of the third embodiment. In the present modification, a determination information storage unit 222-3, an abnormality detection unit 202, and an abnormality processing unit 203 are implemented as internal functions of a gate processing unit 204-3b. Furthermore, the gate processing unit 204-3b further includes a gate unit 205-3b. The gate unit 205-3b has a function of outputting frames in accordance with, for example, the gate states ("o" and "C") of a gate control list.

Furthermore, in the present modification, the abnormality detection unit 202 and the abnormality processing unit 203 are arranged between a frame storage unit 223-3b and a gate unit 205-3b. For example, abnormality detection (abnormality detection unit 202) and abnormality processing (abnormality processing unit 203) are performed while a frame is read from the frame storage unit 223-3b and passed to the gate unit 205-3b.

The processing of the abnormality detection unit 202 and abnormality processing unit 203 may be incorporated into the function of a transmission selection algorithm in the gate processing unit 204-3b.

Sixth Modification

Figure 17:
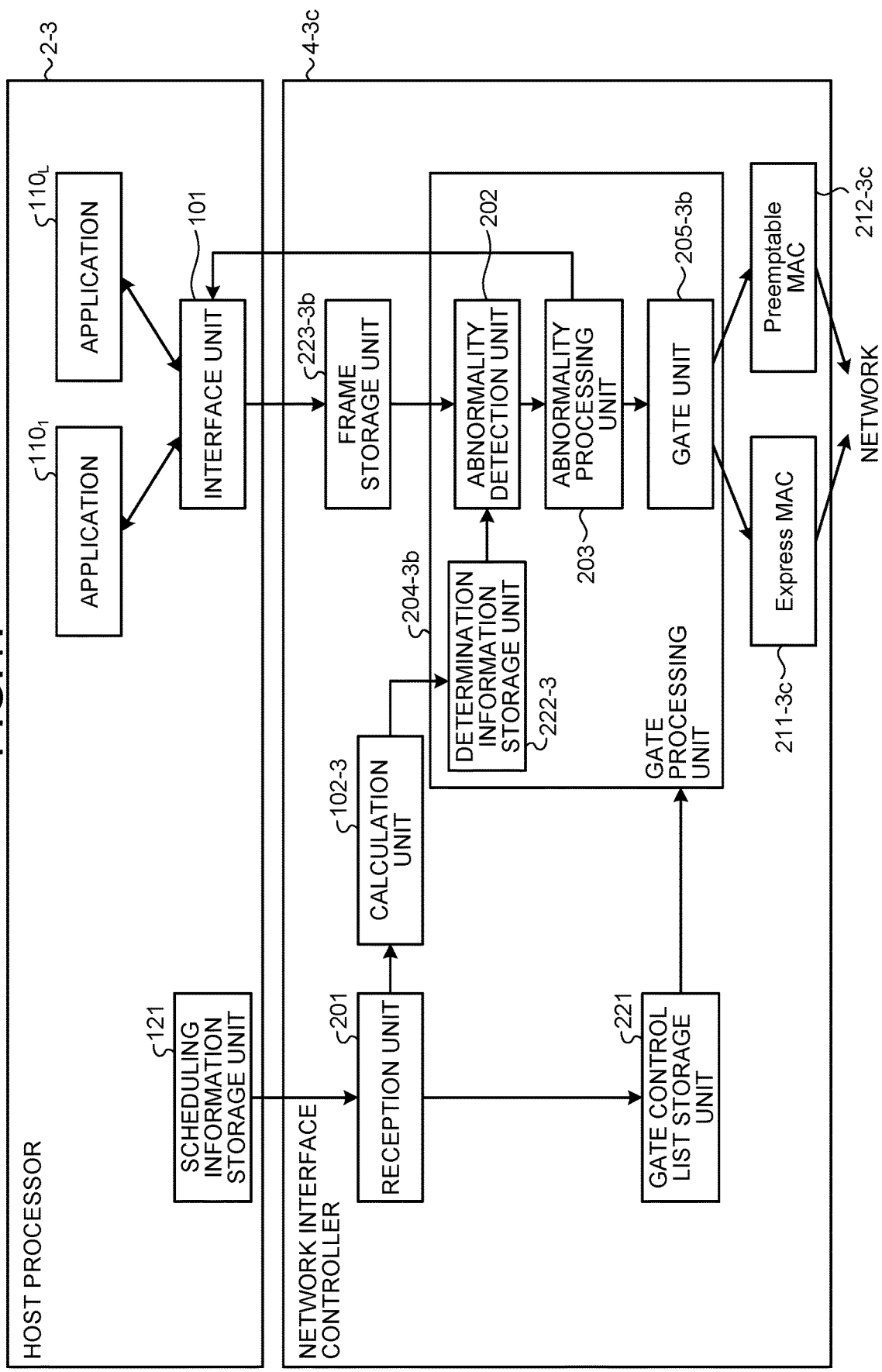
FIG. 17 is a functional block diagram of a communication device according to a modification of the third embodiment.

FIG. 17 is a diagram illustrating an example of the functional configuration of a host processor 2-3 and a network interface controller 4-3c that are included in a communication device according to another modification of the third embodiment. In the present modification, an express MAC 211-3c and a preemptable MAC 212-3c are connected between a gate unit 205-3b and a network.

An abnormality processing unit 203 may transfer a normal frame to the express MAC 211-3c via the gate unit 205-3b. The abnormality processing unit 203 may transfer an abnormal frame to the preemptable MAC 212-3c via the gate unit 205-3b.

Figure 18:
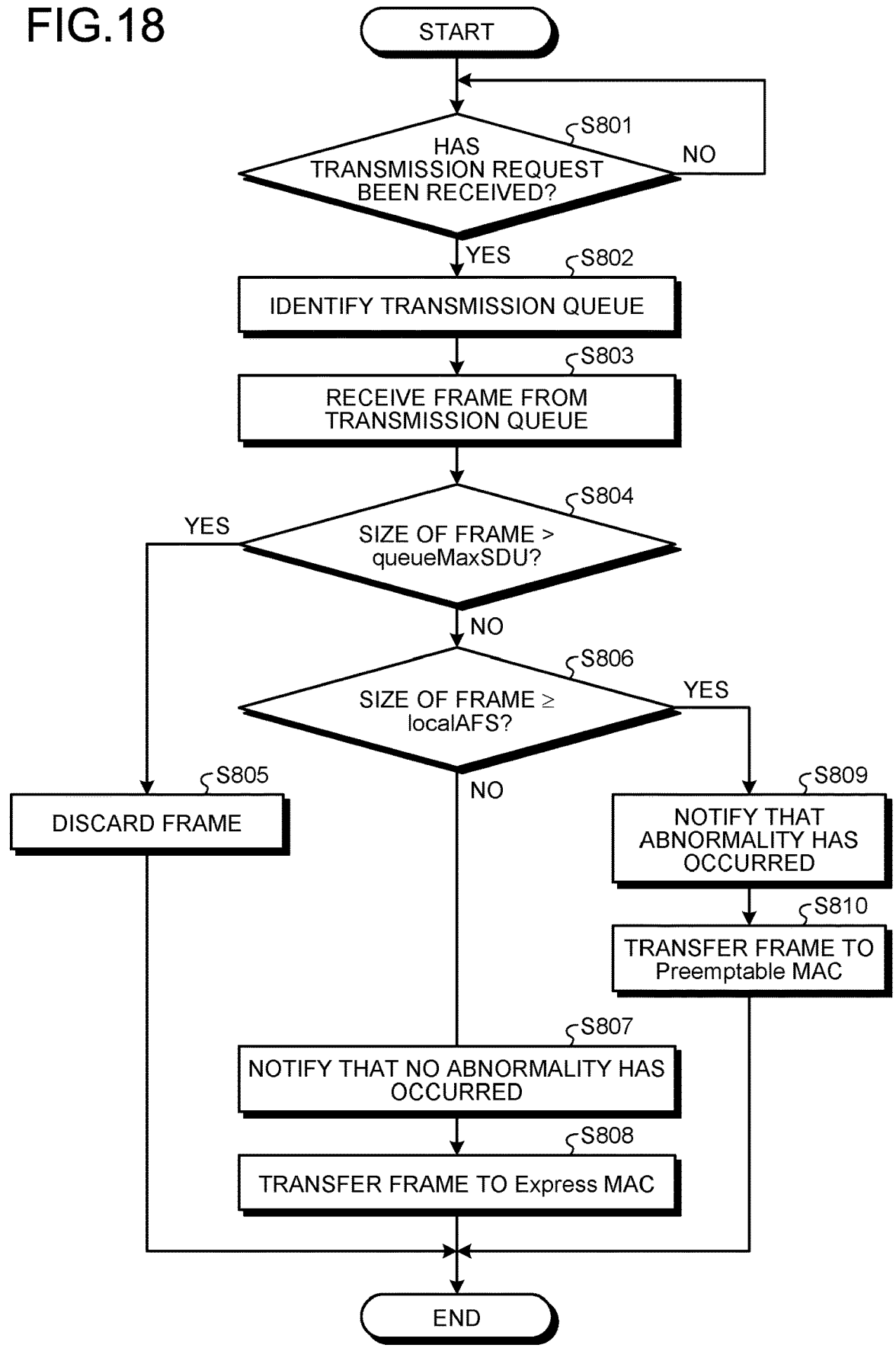
FIG. 18 is a flowchart of a frame transmission process according to a modification of the third embodiment.

FIG. 18 is a flowchart illustrating an example of the frame transmission process according to a sixth modification of the third embodiment. Steps S801 to S802 are similar to Steps S201 to S202 of FIG. 7, and description thereof will be omitted.

In the present modification, an abnormality detection unit 202 in a gate processing unit 204-3b receives a frame from a transmission queue of a frame storage unit 223-3b (Step S803).

Steps S804 to S807 are similar to Steps S203 to S206 of FIG. 7, and description thereof will be omitted. Furthermore, Step S809 is similar to Step S208 of FIG. 7, and description thereof will be omitted.

In the present modification, if no abnormality occurs, the abnormality processing unit 203 transfers a normal frame to the express MAC 211-3c via the gate unit 205-3b (Step S808). When an abnormality occurs, the abnormality processing unit 203 transfers the abnormal frame to the preemptable MAC 212-3c via the gate unit 205-3b (Step S810).

In this way, in the present modification, properly using the two MACs (express MAC 211-3c and preemptable MAC 212-3c) makes it possible to divide a frame and transmit the divided frames by using the frame preemption mechanism of IEEE 802.1Qbu.

As described above, according to the first to third embodiments, it is possible to avoid impairing the real-time performance of communication.

Seventh Modification

In the above, an example of calculating, as the determination information, the abnormal frame size by the calculation unit has been described. For example, in the above description, the calculation unit calculates the abnormal frame size localAFS according to formula (2). The calculation unit may calculate information from which the abnormal frame size localAFS can be calculated, as the determination information. For example, the calculation unit may calculate the following information, as the determination information.

A maximum continuous open duration (maxCOD)

A maximum frame size that is permitted to be normally transmitted (maxPFS)

In a case where such determination information is used, for example, the network interface controller (such as the abnormality detection unit) that has received the determination information preferably calculates the abnormal frame size localAFS from the received determination information according to the respective formulas described above.

Eighth Modification

The above embodiments are examples of a single communication device (communication system) that includes the host processor and the network interface controller. The host processor and the network interface controller may be implemented as functions within a plurality of physically independent devices. For example, the communication system according to the present modification can have a configuration in which an information processing device having a function corresponding to that of the host processor and a communication control device having a function corresponding to that of the network interface controller are connected over a network.

The storage units (the scheduling information storage unit, the gate control list storage unit, the determination information storage unit, and the frame storage unit) according to the first to third embodiments are each implemented by appropriately using an internal/external memory or hard disk of the communication device, a storage medium, such as a CD-R, a CD-RW, a DVD-RAM, and a DVD-R, or the like.

Programs executed by the communication systems according to the first to third embodiments are provided by being incorporated in a read only memory (ROM) or the like in advance.

The programs executed by the communication systems according to the first to third embodiments may be configured to be provided as a computer program product by being recorded in a non-transitory computer-readable recording medium, such as a compact disk read only memory (CD-ROM), a flexible disk (FD), a compact disk recordable (CD-R), or a digital versatile disk (DVD), in an installable or executable file format.

Furthermore, the programs executed by the communication system according to the first to third embodiments may be configured to be stored on a computer connected to a network such as the Internet so as to be provided by being downloaded via the network. Furthermore, the programs executed by the communication system according to the first to third embodiments may be configured to be provided or distributed via a network such as the Internet.

The programs executed in the communication system according to the first to third embodiments can cause a computer to function as the respective units of the communication system described above. The computer is configured to load a program from a computer-readable storage medium into the main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
one or more hardware processors configured to calculate a local abnormal frame size used to detect presence of abnormality based on a first media-dependent overhead, a remote abnormal frame size received from another communication device, and first gate control information of the communication system, the remote abnormal frame size being calculated based on a second media-dependent overhead and second gate control information, the first gate control information and the second gate control information including a plurality of entries each of which indicates gate states corresponding to a plurality of queues,
wherein the local abnormal frame size is updated to a value of the remote abnormal frame size when the value of the remote abnormal frame size is smaller than a value of the local abnormal frame size.

2. The communication system according to claim 1, wherein the local abnormal frame size is information based on a smaller one between
i) a maximum size of a message permitted to be transmitted, the maximum size being calculated for each of the plurality of queues and calculated based on: a link speed; and a maximum available time in which a message is permitted to be transmitted during a period corresponding to one or more continuous entries, and
ii) a maximum size of a message defined in a communication standard based on the first gate control information.

3. The communication system according to claim 1, wherein the one or more hardware processors are configured to detect the presence of abnormality by using local abnormal frame size.

4. The communication system according to claim 3, wherein the one or more hardware processors are configured to perform exception handling process that includes transferring a message to a controller when the presence of abnormality is detected based on the local abnormal frame size, the controller dividing the message by using frame preemption mechanism of IEEE 802.1Qbu.

5. The communication system according to claim 1, wherein the one or more hardware processors are configured to calculate the local abnormal frame size in one or more cases out of:
a case that the first gate control information is changed;
a case that link speed is changed;
a case that information about the remote abnormal frame size is received from another communication device connected over a network; and
a case that information about the remote abnormal frame size is received from a control device that manages another communication device connected over a network.

6. The communication system according to claim 1, wherein the one or more hardware processors are configured to, when the abnormality is detected, provide information about the local abnormal frame size to at least one of: another communication device connected over a network; and a control device that manages another communication device connected over a network.

7. The communication system according to claim 1, further comprising a network interface controller that detects the abnormality by using the local abnormal frame size.

8. The communication system according to claim 1, further comprising:
an information processing device that includes the one or more hardware processors; and
a communication control device connected to the information processing device over a network, the communication control device being configured to detect the abnormality by using the local abnormal frame size.

9. The communication system according to claim 1, wherein the one or more hardware processors are configured to determine, based on the local abnormal frame size, an updated value of a maximum allowable size of a message, the maximum allowable size of a message being defined in a communication standard based on the first gate control information.

10. The communication system according to claim 1, wherein the one or more hardware processors are configured to receive the remote abnormal frame size that is calculated by the another communication device based on the second gate control information of the another communication device.

11. The communication system according to claim 1, wherein the one or more hardware processors are configured to calculate the local abnormal frame before transmitting a message.

12. The communication system according to claim 1, wherein
the remote abnormal frame size is used to detect presence of abnormality in the another communication device.

13. A communication method implemented by a computer, the method comprising:
calculating a local abnormal frame size used to detect presence of abnormality based on a first media-dependent overhead, a remote abnormal frame size received from another communication device, and first gate control information of the communication system, the remote abnormal frame size being calculated based on a second media-dependent overhead and second gate control information, the first gate control information and the second gate control information including a plurality of entries each of which indicates gate states corresponding to a plurality of queues,
wherein the local abnormal frame size is updated to a value of the remote abnormal frame size when the value of the remote abnormal frame size is smaller than a value of the local abnormal frame size.

14. A computer program product comprising a non-transitory computer-readable recording medium on which an executable program is recorded, the program instructing a computer to:

calculate a local abnormal frame size used to detect presence of abnormality based on a first media-dependent overhead, a remote abnormal frame size received from another communication device, and first gate control information of the communication system, the remote abnormal frame size being calculated based on a second media-dependent overhead and second gate control information, the first gate control information and the second gate control information including a plurality of entries each of which indicates gate states corresponding to a plurality of queues, wherein the local abnormal frame size is updated to a value of the remote abnormal frame size when the value of the remote abnormal frame size is smaller than a value of the local abnormal frame size.

* * * * *